United States Patent

Wood

Patent Number: 5,144,823
Date of Patent: Sep. 8, 1992

[54] BEND ANGLE INDICATOR

[75] Inventor: Gary J. Wood, El Cajon, Calif.

[73] Assignees: Robert Gene Smith; Johnathan Dean Limpert, both of San Diego, Calif. ; part interest to each

[21] Appl. No.: 798,973

[22] Filed: Nov. 29, 1991

Related U.S. Application Data

[63] Continuation of Ser. No. 664,743, Mar. 5, 1991, abandoned.

[51] Int. Cl.$^5$ .............................................. B21D 7/14
[52] U.S. Cl. ........................................ 72/31; 72/34; 72/459; 33/366
[58] Field of Search ................. 72/31, 32, 34, 36, 458, 72/459; 33/373, 334, 369, 366

[56] References Cited

U.S. PATENT DOCUMENTS

| | | | |
|---|---|---|---|
| 2,932,225 | 4/1960 | Gardner | 72/31 |
| 4,325,190 | 4/1982 | Duerst | 33/366 |
| 4,425,784 | 1/1984 | D'Gerolamo | 72/459 |
| 4,536,967 | 8/1985 | Beitzer | 33/366 |
| 4,547,972 | 10/1985 | Heidel et al. | 33/366 |
| 4,622,837 | 11/1986 | Bergman | 72/34 |

Primary Examiner—David Jones
Attorney, Agent, or Firm—Frank D. Gilliam

[57] ABSTRACT

A removable attachment for a tube bender or for the tube to be bent for predetermining a selected bend angle to which the tube is to be bent prior to the bending operation. In a first embodiment of the device, an audio and/or visual indicator indicates when the desired bend angle is achieved. In a second embodiment of the device, an audio indicator indicates during the bending operation when the desired bend angle is being approached and a second audio/visual indication indicates when the desired bend angle is achieved. In both embodiments an electrical continuity tester is provided.

11 Claims, 1 Drawing Sheet

BEND ANGLE INDICATOR

This application is a continuation of application Ser. No. 07/664,743, filed Mar. 5, 1991, now abandoned.

BACKGROUND OF THE INVENTION

The invention is directed to the bending of electrical conduit or tubes used in building construction or the like and more specifically to the establishing accurate angle bends to a predetermined bend angle.

New construction and remodeling of existing construction continues to consumes a considerable amount of the existing labor force. New and untrained workers are entering this field in mass every day around the world. A large number of these workers are concentrated in the electrical construction field. Electrical construction requires the manual or powered bending of various sized electrical conduit or tubes through which electrical wire is run to comply with various building codes and to aesthetically conform to inner walls and between the floors of the building under construction. It is important as well as a requirement that the conduits or tubes be bent at the correct angles. In general, the requirements of the run of conduit or tubes are estimated by the worker and the conduit is then bent visually by the worker to the calculated/estimated angle and then positioned for installation. This bending or adjustments to the bending may require several such steps before the conduit or tube is bent at the corrected desired angle. This operation requires a considerable amount of time a lot of which could be saved if a precise bend at the desired angle could be accomplished in a single operation rather than repeated trial and error.

Presently, the standard bending tool has rough lines or groves or an embedded bubble level to help guide the worker with a very rough estimate of the angle the worker is attempting to bend. Generally, each bend requires several attempts as noted above before the conduit or tube is close enough to the desired bend angle to be finally installed. These existing devices are designed for use on a substantially level surface, but as a practical matter level surfaces are few and far between on actual construction sites which tend to render the angle indication devices of the present art useless.

There has not been a truly suitable device for accurately bending conduit or tubes used to run electrical wires in building construction until the emergence of the instant invention.

SUMMARY OF THE INVENTION

The invention comprises a device that can either be attached to a manual or powered conduit or tube bender or to the actual conduit to be bent formed. A first embodiment of the device comprises a electrical circuit which when energized and calibrated to a true horizontal reference, i.e. zero angle bend, can then be adjusted to a desired bend angle and when the conduit is being bent indicates when the selected bend angle has been achieved.

In a second embodiment of the device a first indication warns that the desired angle is being approached and a second indication indicates when the desired bend angle is reached.

Both of the embodiments include a continuity tester. The device is battery powered.

An object of this invention is to provide a device to make accurate and predetermined angled bends in electrical conduits or tubes.

Another object of this invention is to provide a device to make accurate angled bends in electrical conduits or tubes which provides an indication when the selected angle of a bend is achieved.

Another object of this invention is to provide a device to make accurately selected angled bends in electrical conduits or tubes which provides a first indication that the selected angle is being approached and a second indication that the selected bend angle is achieved.

Yet another object of this invention is to provide a device to make accurate bend angles in electrical conduits, tubes or the like which incorporates an electrical continuity tester.

Other objects and features of the invention will become apparent as the drawings which follow are understood by reading the corresponding description thereof.

BRIEF DESCRIPTION OF THE DRAWING FIGURES

DETAILED DESCRIPTION OF THE PREFERRED EMBODIMENTS

Figure 1:
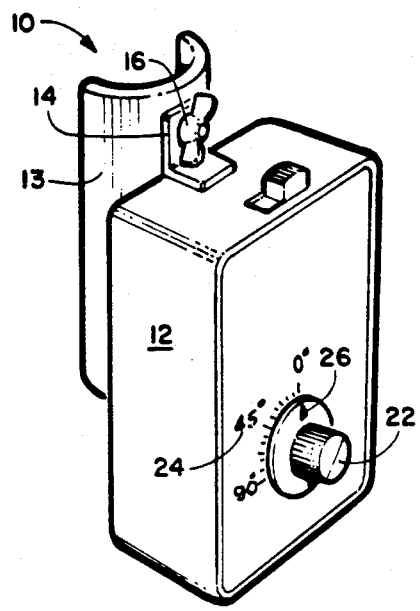
FIG. 1 is a perspective showing of the device showing the angular setting positions of the control knob of the device.
Figure 4:
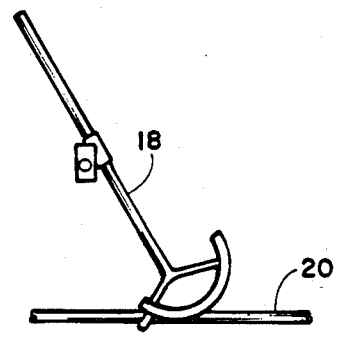
FIG. 4 depicts a schematic showing of the device attached to the bending tool for bending a conduit or tube prior to the actual bending operation.
Figure 6:
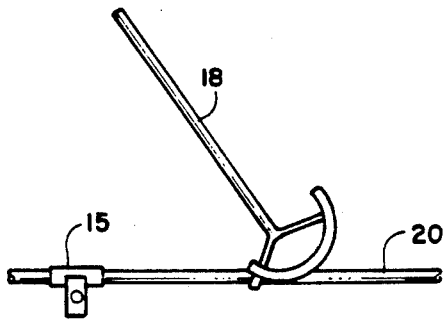
FIG. 6 depicts a schematic showing of the device attached to the conduit or tube prior to the bending operation.
Figure 5:
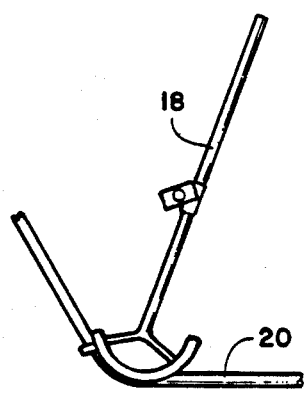
FIG. 5 depicts the showing of FIG. 4 after the desired bend is accomplished.
Figure 7:
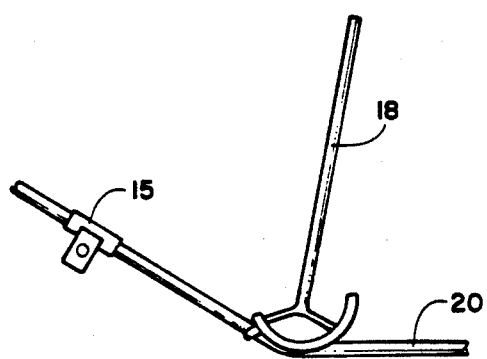
FIG. 7 depicts a showing of FIG. 6 after the desired angular bend in the conduit or tube is accomplished.

Referring now specifically to drawing FIG. 1 which depicts a perspective showing of the angle indicating device 10 of the invention. The device is housed in a box 12 which is enclosed on all sides. The device is either removably attached to the bending tool or to the conduit or tube to be bend formed by any convenient attachment means 13 such as an open tubular spring, clamps, magnet, etc. suitable for the purpose intended. The device is shown rotatable attached through a open tubular clip 14 in FIGS. 1, 4 and 5 and a magnet 15 as shown in FIGS. 6 and 7 both of which are attached to the box 12 via a winged nut and bolt combination 16, as shown, or any other rotatable attachment means suitable for the purpose intended that allows the device 10 to have relative rotation between the tool 18 or conduit 20 and can be held in a selected relative position as shown by way of example by the tightening of the wing nut on the bolt in a conventional manner.

The electrical circuits of the device as shown in drawing FIGS. 4-7 are controlled by rotation of the knob 22, when the device is rotatably connected to the conduit, and angle determining mercury switch firstly to a "0" angle position as shown on the indicator scale 24 on the device to calibrate a true horizontal position for the tool or conduit, i.e. depending on which element the device is attached. After calibration to true horizontal, the dial is rotated until the indicating pointer 26 aligns with the angle of the desired bend to be made on the conduit or tube.

Figure 2:
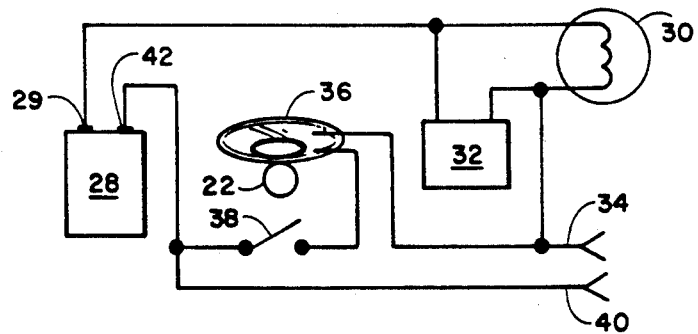
FIG. 2 depicts a schematic electrical showing of a first embodiment of the device.

Referring now to drawing FIG. 2 which depicts an electrical schematic of the first embodiment of the invention. As shown the electrical circuit of the first embodiment includes a battery power supply 28 the positive terminal 29 of which is connected to one side of a light 30 of the LED low current type or the like and a audio sounder 32. The opposite side of the light and the audio sounder are connected to one side of a external jack 34 for use as a continuity tester and to one side of a mercury switch 36 which is fixedly attached to the knob 22. The opposite side of the mercury switch is connected to one side of a power switch 38. The other side of the power switch 38 and an external jack 40 is connected to the negative terminal 42 of the battery 28. The external jacks 34 and 40 constitute the continuity tester portion of the device 10, i.e. with external leads, not shown, are placed at each end of a complete circuit the light will illuminate and the audio sounder will sound.

In operation this embodiment operates as follows, the device is attached to either the tool for bending or the conduit as shown in drawing FIGS. 4-7. The power switch is turned on supplying power to the device 10. The knob and mercury switch are then rotated until the pointer on the knob indicates "0" degrees. The device is then rotated relative to its attached member until the light lights and the audio sounder sounds. The device is then secured to the attached member in that relative position. The device is now calibrated so the "0" mark is 90 degrees perpendicular to the position of the conduit to be bent. The bend operator then selects the angle to which the operator desires to bend the conduit or tube and rotates the knob 22 until the pointer indicates that desired angle. The tube is then bent in a conventional manner until the light again lights and the audio indicator sounds indicating the selected bend angle for the conduit or tube. The conduit or tube is now ready to be installed or prepared for additional bends.

Figure 3:
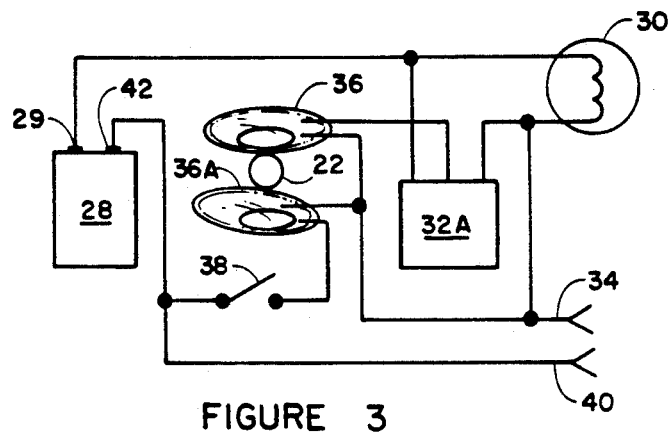
FIG. 3 depicts a schematic electrical showing of a second embodiment of the device.

Referring now to drawing FIG. 3 which depicts a second embodiment of the device of the invention. This circuit essentially functions in the same manner as the circuit of drawing FIG. 2 except that a second mercury switch 36A is also attached to the knob 22 and positioned at slightly a different angle than the mercury switch 36 so as to close and complete an electrical circuit slightly ahead of the closure of mercury switch 36 and an the addition of an audio sounder 32A. This under has two sound emitting sections. The section activated by closure of mercury switch 36A emits sound pulses and the other section activated by mercury switch 36 emits a steady audio tone.

This circuit operates as discussed under the first embodiment above and additionally emits an pulsed audio tone as the bend approaches the desired angle and like the first embodiment emits a steady audio tone and illuminates the light when the desired preset bend angle is achieved.

It should be understood that the conduits or tubes can be cold or hot formed.

It should be understood that if the connection of the device to the conduit is not relatively positionable that is the wing nut is permanently tightened and no relative positioning of the device relative to the conduit is possible, the indicator scale for the calibration of 0 degrees can be rotated relative to the conduit, the device and the knob to read 0 degrees at the pointer location where the audio signal sounds and leaving the scale in this rotational calibrate position and rotating the knob as hereinbefore discussed.

While a specific embodiment of bend angle indicating device has been shown and fully explained above for the purpose of illustration it should be understood that many alterations, modifications and substitutions may be made to the instant invention disclosure without departing from the spirit and scope of the invention as defined by the appended claims.

What is claimed is

1. A bend angle indicator for indicating a selected bend angle to a conduit or a tube comprising:
   a bending tool;
   attachment means for removably attaching said end angle indicator to said bending tool;
   means for calibrating the bend angle indicator to a true conduit or tube horizontal reference;
   means for pre-selecting a desired bend angle to said conduit or tube from said true horizontal reference; and
   means for indicating said pre-selected bend angle when achieved.

2. The bend angle indicator of claim 1 wherein said attachment means is an open tubular spring clip which grips around said bending tool.

3. The bend angle indicator of claim 1 wherein said attachment means allows relative rotation between said bending tool and said bend angle indicator.

4. The bend angle indicator of claim 1 wherein said means for calibrating for a zero angle bend comprises a rotationally positionable mercury switch positioned to close at a zero angle bend.

5. The bend angle indicator of claim 1 wherein said means for pre-selecting a desired bend angle comprises a rotationally positionable mercury switch positioned to close at said pre-selected bend angle.

6. The bend angle indicator of claim 1 additionally comprising a means for indicating a bend angle slightly less than said pre-selecting bend angle.

7. The bend angle indicator of claim 6 wherein said means for indicating a bend angle slightly less than said pre-selected angle is an audio indication.

8. The bend angle indicator of claim 7 wherein said audio indication is sequentially on and off.

9. The bend angle indicator of claim 1 wherein said means for indicating said pre-selected bend angle is a audio sounder.

10. The bend angle indicator of claim 1 wherein said means for indicating said pre-selected bend angle is a visual indicator.

11. The bend indicator of claim 10 wherein said visual indicator is an LED lamp.

* * * * *